US011753700B2

(12) United States Patent
Tarasenko et al.

(10) Patent No.: US 11,753,700 B2
(45) Date of Patent: Sep. 12, 2023

(54) PROCESS FOR REDUCING THE CONTENT OF OXYGEN IN METALLIC COPPER

(71) Applicant: HALDOR TOPSØE A/S, Kgs. Lyngby (DK)

(72) Inventors: Artem Tarasenko, Moscow Region (RU); Niklas Bengt Jakobsson, Kågeröd (SE); Bengt Peter Gustav Blennow, Humlebæk (DK); Casper Hadsbjerg, Holte (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 448 days.

(21) Appl. No.: 16/608,941

(22) PCT Filed: Apr. 16, 2018

(86) PCT No.: PCT/EP2018/059659
§ 371 (c)(1),
(2) Date: Oct. 28, 2019

(87) PCT Pub. No.: WO2018/206237
PCT Pub. Date: Nov. 15, 2018

(65) Prior Publication Data
US 2020/0190625 A1 Jun. 18, 2020

(30) Foreign Application Priority Data
May 10, 2017 (DK) .......................... PA 2017 00293

(51) Int. Cl.
*C22B 15/00* (2006.01)
*C25B 1/23* (2021.01)
(52) U.S. Cl.
CPC .............. *C22B 15/006* (2013.01); *C25B 1/23* (2021.01)
(58) Field of Classification Search
CPC .............. C22B 15/006; C22B 15/0052; C22B 15/0095
See application file for complete search history.

(56) References Cited

U.S. PATENT DOCUMENTS

| | | | |
|---|---|---|---|
| 2,479,311 A | 8/1949 | Christensen et al. | |
| 3,281,236 A | 10/1966 | Meissner | |
| 3,484,280 A | 12/1969 | Carreker | |
| 3,528,803 A | 9/1970 | Ichikawa et al. | |
| 3,844,772 A * | 10/1974 | Sherman | ............... C22B 15/006 75/646 |
| 3,873,438 A | 3/1975 | Andreson et al. | |
| 4,059,437 A | 11/1977 | Nesslage et al. | |
| 4,118,256 A | 10/1978 | Schmitt-thomas et al. | |
| 4,814,235 A | 3/1989 | Hecht et al. | |
| 5,308,379 A | 5/1994 | Ishida et al. | |

| | | | |
|---|---|---|---|
| 2004/0096353 A1 | 5/2004 | Salonen et al. | |
| 2012/0036963 A1* | 2/2012 | George | ............... C22B 15/0036 75/649 |
| 2015/0038741 A1* | 2/2015 | Pedersen | ............... C25B 1/00 562/607 |

FOREIGN PATENT DOCUMENTS

| | | |
|---|---|---|
| CN | 1628924 A | 6/2005 |
| CN | 101274363 A * | 10/2008 |
| CN | 102994786 A | 3/2013 |
| CN | 106311788 A * | 1/2017 |
| CN | 106498180 A | 3/2017 |
| EP | 3031956 A1 * | 6/2016 |
| JP | S49-039740 B | 10/1974 |
| JP | 2003-231913 A | 8/2003 |
| WO | 2004087976 A1 | 10/2004 |
| WO | 2006029162 A1 | 3/2006 |
| WO | 2012146826 A1 | 11/2012 |
| WO | 2013/131778 A1 | 9/2013 |
| WO | 2013131778 A2 | 9/2013 |
| WO | 2014/154253 A1 | 10/2014 |
| WO | 2014154253 A1 | 10/2014 |
| WO | 2015189064 A1 | 12/2015 |

OTHER PUBLICATIONS

English translation of CN 106311788-A (originally published Jan. 11, 2017) obtained from Espacener.*
English translation of CN 101274363 (originally published Oct. 1, 2008), obtained from PE2E search.*
International Search Report (PCT/ISA/210) dated Jun. 29, 2018, by the European Patent Office as the International Searching Authority for International Application No. PCT/EP2018/059659.
Written Opinion (PCT/ISA/237) dated Jun. 29, 2018, by the European Patent Office as the International Searching Authority for International Application No. PCT/EP2018/059659.
Andreini, R.J., et al., "Copper Deoxidation Kinetics Utilizing Carbon Monoxide," *Metallurgical Transactions B*., vol. 8B, Dec. 1, 1977, pp. 633-638, XP002782137.
Jones, H. A., et al."The Reduction of Copper Oxide by Carbon Monoxide and the Catalytic Oxidation of Carbon Monoxide in the Presence of Copper and Copper Oxide", Jour. Am. Chem. Soc., vol. 43, No. 10, 1922 thesis, 29 pages.
Kang et al.,"Transactions of the Indian Institute of Metals", vol. 67, No. 5, 2014, Abstract, 1 page.
Office Action (Notice of Reasons for Refusal) dated Feb. 17, 2022, by the Japanese Patent Office in corresponding Japanese Patent Application No. 2019-561781, and an English Translation of the Office Action. (12 pages).
Seizo Nagasaki, Makoto Hirabayashi, Cu—O, Binary alloy state diagrams, 2nd edition, Jul. 30, 2010, 315, 3 pages.
Office Action (the Second Office Action) dated Dec. 21, 2021, by the State Intellectual Property Office of the People's Republic of China in corresponding Chinese Patent Application No. 201880029503.8, and an English Translation of the Office Action. (7 pages).
Blennow, P. et al."Co from Co2 On-site Carbon Monoxide on demand" ICE2017, Copenhagen, Jun. 12-15, 2017, 22 pages.

(Continued)

*Primary Examiner* — George Wyszomierski
(74) *Attorney, Agent, or Firm* — Boone IP Law

(57) ABSTRACT

The content of oxygen in molten metallic copper is reduced during the copper refining process by adding pure carbon monoxide, produced by electrolysis of carbon dioxide in a solid oxide electrolysis cell (SOEC), thereby removing oxygen through the reduction of CuO to Cu. This way, the purity of the metallic copper is increased.

10 Claims, No Drawings

(56) References Cited

OTHER PUBLICATIONS

Office Action (Notice of Reasons for Refusal) dated Nov. 16, 2022 by the Japanese Patent Office in corresponding Japanese Patent Application No. 2019-561781, and an English Translation of the Office Action. (8 pages).

Otsuka, S. et al."Deoxidation Mechanism of Liquid Copper by Reducing Mixtures",Journal of Japan, Nippon Metal Research Institute, vol. 1977, No. 02, Jan. 28, 123, vol. 41, No. 2, p. 117, 7 pages.

* cited by examiner

PROCESS FOR REDUCING THE CONTENT OF OXYGEN IN METALLIC COPPER

The present invention relates to a process for reducing the content of oxygen in metallic copper. More specifically, the invention deals with reducing the oxygen content in metallic copper using carbon monoxide.

Copper metal is prepared industrially in various ways. Copper sulfide ores, usually containing only 1% to 2% copper, are concentrated to 20% to 40% copper and then usually first roasted to remove some of the sulfur and other impurities and then smelted with iron oxide to produce copper matte, a molten solution of copper sulfide mixed with small amounts of iron sulfide. The matte is transferred to a converter, where it is treated by blowing air through it to remove the sulfur (as sulfur dioxide) and the iron (as a slag of ferrous oxide). The resulting copper is 98% to 99% pure; it is called blister copper because its surface is blistered by escaping gases as the metal solidifies during casting.

Most copper is further purified by electrolysis. The blister copper is refined in a furnace and cast into anodes. Thin sheets of pure copper are used as cathodes. A solution of copper sulfate and sulfuric acid is used as the electrolyte. When the anode and cathode are immersed in the electrolyte and an electric current is passed, the anode is dissolved in the electrolyte and very pure copper metal is deposited on the cathode. Soluble impurities, usually nickel and arsenic, remain dissolved in the electrolyte. Insoluble impurities, often including silver, gold and other valuable metals, settle out of the electrolyte; they may be collected and purified.

Although most metals find their major industrial use in the form of alloys, this is not true for copper, even though a few prior art documents disclose copper alloys. Thus, WO 2004/087976, US 2004/0096353 and CN 1628924 deal with Cu alloys with Mg, Sn and Ag, respectively.

Metallic copper is used most extensively as an electric conductor and also in heating or cooling radiators, both fields of use requiring high conductivity, electrical in the first case and thermal in the other, which in turn requires very high purity. The commercial production of pure copper gives rise to numerous metallurgical problems. Electrolytic refining reduces the content of metallic impurities in the copper to tolerably low levels, leaving oxygen (unavoidably introduced during melting of the cathode copper) as the principal impurity in the metal. Oxygen-free copper can be produced by adding phosphorus to the liquid metal, but ordinarily the residual phosphorus content reduces the conductivity of the metal below that required for electrical applications. Oxygen-free high conductivity (OFHC) copper is melted and cast in a carbon monoxide atmosphere and is used in various electrical applications. Methods for copper refining and production of oxygen-free copper are abundantly disclosed in U.S. Pat. Nos. 3,281,236; 2,479,311; 3,528,803; 4,118,256; 4,059,437; 4,814,235; CN 102994786 and WO 2006/029162, the latter dealing with a method of continuous fire refining of copper.

The details of the copper refining process depend on the type of minerals the copper bound with. Copper ore rich in sulfides are processed via pyrometallurgy, while copper ore rich in oxides are refined through hydrometallurgy.

In pyrometallurgy, the concentrate is dried before being heated in a furnace. Chemical reactions that occur during the heating process cause the copper concentrate to segregate into two layers of material: The matte layer and the slag layer. The matte layer, on the bottom, contains the copper, while the slag layer, on the top, contains the impurities.

The slag is discarded and the matte is recovered and moved to a cylindrical converter. A variety of chemicals are added to the converter, and these react with the copper. That results in the formation of converted copper, the above-mentioned blister copper. The blister copper is recovered, and is then subjected to fire refining.

In the hydrometallurgical process, copper oxide ore is leached with sulfuric acid, after which the metal may undergo further refining via one of a few processes.

The least common method is cementation, in which an acidic solution of copper is deposited onto scrap iron in an oxidation-reduction reaction. After sufficient amounts of copper have been plated, the copper is then further refined.

The more commonly employed refining method is solvent extraction and electrowinning. This newer technology became widely adopted in the 1980s, and roughly 20 percent of the copper in the world is produced via this process.

Solvent extraction begins with an organic solvent, which separates copper from impurities and unwanted material. Next, sulfuric acid is added to strip the copper from the organic solvent, producing an electrolytic solution.

This solution is then put through the electrowinning process, which, simply put, plates copper in the solution onto a cathode. This copper cathode can be sold as it is, but it can also be made into rods or starting sheets for other electrolytic cells.

In fire refining, air and natural gas are blown through the copper to remove any remaining sulfur and oxygen, leaving refined copper behind to be processed into copper cathode.

This copper is cast into copper anodes and placed in an electrolytic cell. Once charged, the pure copper collects on the cathode and is removed as a 99 percent pure product.

Two chemical reactions are involved in the refining of copper, namely sulfur removal and oxygen removal. The oxygen concentration in newly desulfurized molten copper is ~0.3 mass percent. Most of this dissolved oxygen would precipitate as solid $Cu_2O$ inclusions during casting, so it must be removed to a low level.

Copper oxide precipitation is minimized by removing most of the oxygen from the molten Cu with injected gas or liquid hydrocarbons. Representative dissolved oxygen removal reactions are:

$$H_2C(s,l,g) + 2|O| \rightarrow H_2O(g) + CO(g) \tag{1}$$

$$CO(g) + |O| \rightarrow CO_2(g) \tag{2}$$

$$H_2(g) + |O| \rightarrow H_2O(g) \tag{3}$$

where reaction (2) is especially relevant for the present invention.

The presence of oxygen as an impurity in copper leads to two difficulties from the standpoint of the mechanical properties of the metal: It somewhat decreases the ductility, and it can lead to embrittlement if the metal is heated in an atmosphere containing hydrogen.

In his 1922 thesis "The Reduction of Copper Oxide by Carbon Monoxide and the Catalytic Oxidation of Carbon Monoxide in the Presence of Copper and Copper Oxide", Howard A. Jones showed that the reduction of CuO by CO is an auto-catalytic process with elemental copper being the auto-catalyst, and that the mechanism for the combination of carbon monoxide-oxygen mixtures over copper oxide is alternating reduction and oxidation of the copper oxide, the interface between the two phases (Cu/CuO) playing an important role in the reduction of CuO by CO. The net result is the reaction $$CuO + CO \rightarrow Cu + CO_2$$

So carbon monoxide (CO) is used in the copper industry as an efficient agent to reduce the oxygen content in the copper in order to achieve a higher grade of material. In the majority of the industry, coke or a hydrocarbon fuel, such as diesel, is added to the copper during smelting to reduce the oxygen content. However, these solutions all imply introduction of other components in addition to CO, such as hydrogen and coke from incomplete oxidation of hydrocarbons, as well as sulfur and water. Furthermore, when diesel fuel is added to the furnace, minor nitrogen impurities (about the same level as sulfur, depending on the diesel quality) may also be expected.

The deoxidation of a copper melt by CO gas bubbling to produce oxygen-free copper has been studied by Kang et al., Transactions of the Indian Institute of Metals, vol. 67(5), 617-622 (2014). Pure (approx. 99.9%) copper samples were melted by induction melting under an argon atmosphere. When the samples were completely melted, CO gas was introduced into the melt to achieve deoxidation. Oxygen concentrations in the melt were reduced to less than 6 ppm.

There are several advantages in using pure CO to reduce the oxygen content in copper. One significant advantage is that hydrogen is avoided, which would otherwise increase the brittleness of the produced copper. Many copper smelting plants in operation today deliberately use high purity CO from cylinders or tube trailers to avoid hydrogen and other harmful impurities.

Producing carbon monoxide (CO) through electrolysis of carbon dioxide ($CO_2$) has inherent advantages, and this method is a surprisingly good match for providing CO to reduce the oxygen content in copper. In WO 2014/154253, the Applicant has disclosed this method, which is conducted in a solid oxide electrolysis cell (SOEC) or, typically, in an SOEC stack consisting of a large number of solid oxide cells separated by interconnects. The key element in the cells is the electrolyte where an oxygen ion can be dissociated from $H_2O$ or $CO_2$ when an electric current ($e^-$) is applied, viz.

$$CO_2 + 2e^- \rightarrow CO + O^{2-} \text{ or } H_2O + 2e^- \rightarrow H_2 + O^{2-}$$

In the method, $CO_2$ is led to the fuel side of the stack with an applied current and excess oxygen is transported to the oxygen side of the stack, optionally using air or nitrogen to flush the oxygen side, and the product stream from the SOEC, containing CO mixed with $CO_2$, is subjected to a separation process. The method further comprises heating the inlet gas on both the fuel side and the oxygen side by means of separate heating units, so as to supply heat to the SOEC, where the operation temperature of said heating units is at least equal to the operation temperature of the cell stack minus 50° C., preferably at least equal to the operation temperature of the cell stack. An apparatus for the production of high purity CO based on SOEC electrolysis of $CO_2$ in combination with a high purity $CO_2$ feedstock is disclosed in WO 2013/131778, also belonging to the Applicant.

Thus, according to Applicant's above WO documents, CO is produced from high purity $CO_2$ (food or beverage grade) and electrical power. The resulting gas is a pure mixture of CO and $CO_2$, in which the only source of undesired impurities consists in traces of hydrocarbons and water present in the $CO_2$ feed. These traces are converted to trace levels of hydrogen.

In a plant for the production of high purity CO based on SOEC electrolysis of $CO_2$, the feed $CO_2$ is converted to a mixture of CO and $CO_2$. Normally, the produced gas is then further purified through a set of processing unit operations, the most common of which consists in compressing of the product mixture from the electrolysis followed by a pressure swing adsorption (PSA) step and, for high purity CO, a polishing step with applied temperature swing adsorption (TSA).

Importantly, however, in the case of oxygen removal from copper there is no need at all for further removal of $CO_2$ from the gas produced in the electrolysis step, since $CO_2$ is an inert to the copper refining process. This means that the mixture of CO and $CO_2$ obtained by electrolysis of $CO_2$ can be fed directly into the copper refining process, which significantly reduces cost and greatly reduces the plant complexity of the CO generating plant.

So the present invention relates to a process for reducing the content of oxygen, present as copper oxide, in molten metallic copper, which has been obtained in a manner known per se and subjected to a copper refining process, wherein carbon monoxide produced from carbon dioxide in a solid oxide electrolysis cell (SOEC) stack is added during the refining process to remove the oxygen according to the equation $$CuO + CO \rightarrow Cu + CO_2$$

thereby increasing the purity of the metallic copper.

Preferably the product gas from the SOEC stack is compressed and added to the copper melt through an injection system that disperses the reducing gas in the shape of small bubbles throughout the copper melt. This way, the gas/solid contact surface is maximized.

It is also preferred that the gas from the SOEC stack is purified to above 99% pure carbon monoxide and mixed with nitrogen before it is injected into the copper melt.

Preferably the product gas from the SOEC stack comprises at least 10% CO, the remaining part being $CO_2$ or an inert gas. The amount of CO in the product gas may of course be much higher, such as 20%, 30%, 40% or above.

The invention claimed is:

1. A process for reducing the content of oxygen, present as copper oxide, in molten metallic copper, which is subjected to a copper refining process, the process comprising:
    feeding a fed gas comprising carbon dioxide to a solid oxide electrolysis cell (SOEC) stack to produce a product gas comprising carbon monoxide and carbon dioxide;
    injecting the product gas into the molten metallic copper through an injection system that disperses the product gas in bubbles throughout the molten metallic copper, wherein the carbon monoxide removes the oxygen from the molten metallic copper according to the equation:

$$CuO + CO \rightarrow Cu + CO_2$$

thereby increasing the purity of the molten metallic copper,
    wherein the product gas from the SOEC stack is compressed and wherein the injection system disperses the product gas in bubbles throughout the molten metallic copper to enhance a contact surface between the product gas and the molten metallic copper.

2. The process according to claim 1, wherein the product gas from the SOEC stack consists essentially of CO, $CO_2$, and optionally an inert gas, wherein the product gas is at least 10% CO.

3. The process according to claim 2, wherein the product gas from the SOEC stack consists essentially of CO, $CO_2$, and optionally an inert gas, wherein the product gas is at least 20% CO.

4. The process according to claim 3, wherein the product gas from the SOEC stack consists essentially of CO, $CO_2$, and optionally an inert gas, wherein the product gas is at least 30% CO.

5. The process according to claim 4, wherein the product gas from the SOEC stack consists essentially of CO, $CO_2$, and optionally an inert gas, wherein the product gas is at least 40% CO.

6. The process according to claim 1, wherein the product gas from the SOEC stack consists of CO and CO2.

7. The process according to claim 1, wherein the feed gas consists of:
carbon dioxide;
optionally trace amounts of hydrocarbons; and
optionally trace amounts of water.

8. The process according to claim 1, wherein the product gas from the SOEC stack consists of CO, $CO_2$, and trace levels of hydrogen.

9. A process for reducing the content of oxygen, present as copper oxide, in molten metallic copper, which is subjected to a copper refining process, the process comprising:
feeding a feed gas comprising carbon dioxide to a solid oxide electrolysis cell (SOEC) stack to produce a product gas comprising carbon monoxide;
purifying the product gas to above 99% pure carbon monoxide;
mixing the purified gas from the SOEC stack with nitrogen to form a mixed gas; and
injecting the mixed gas into the molten metallic copper through an injection system that disperses the mixed gas in bubbles throughout the molten metallic copper, wherein the carbon monoxide removes the oxygen from the molten metallic copper according to the equation $$CuO + CO \rightarrow Cu + CO_2$$

thereby increasing the purity of the molten metallic copper.

10. A process for reducing the content of oxygen, present as copper oxide, in molten metallic copper, which is subjected to a copper refining process, the process comprising:
feeding a feed gas comprising carbon dioxide to a solid oxide electrolysis cell (SOEC) stack to produce a product gas consisting essentially of CO, $CO_2$, and optionally an inert gas, wherein the product gas is at least 10% CO;
purifying the product gas in favor of CO to produce a purified gas comprising CO;
mixing the purified gas from the SOEC stack with nitrogen to form a mixed gas; and
injecting the mixed gas into the molten metallic copper through an injection system that disperses the mixed gas in bubbles throughout the molten metallic copper, wherein the carbon monoxide removes the oxygen from the molten metallic copper according to the equation $$CuO + CO \rightarrow Cu + CO_2$$

thereby increasing the purity of the molten metallic copper.

* * * * *